Dec. 12, 1944. O. E. ROSEN 2,364,873
CONTROL DEVICE FOR DUPLICATING MACHINES
Filed Dec. 14, 1938 3 Sheets-Sheet 1
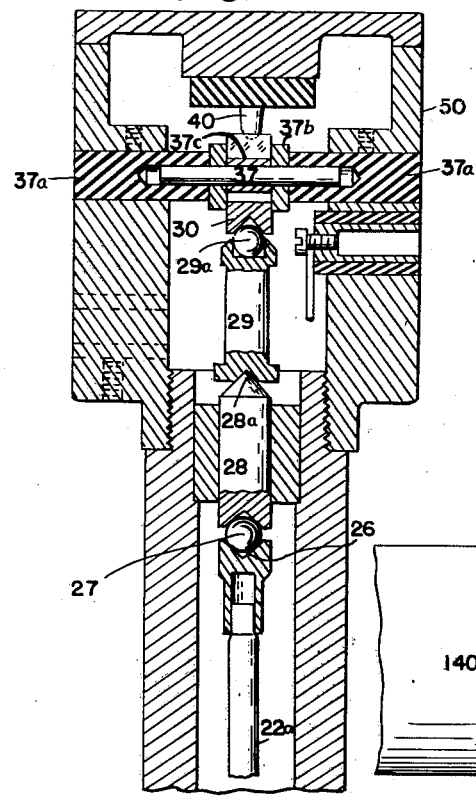
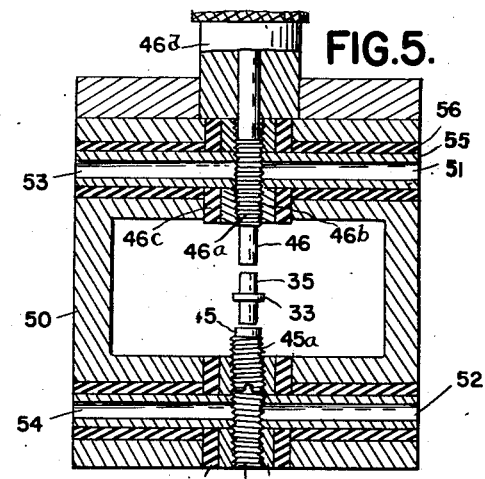
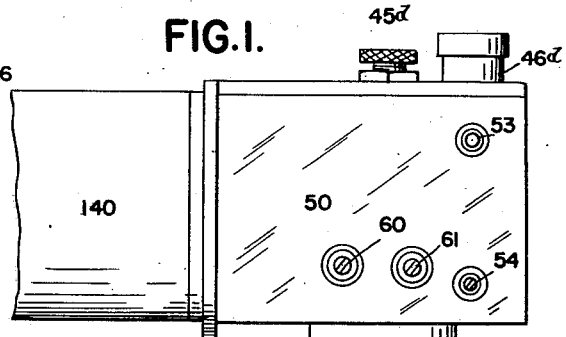
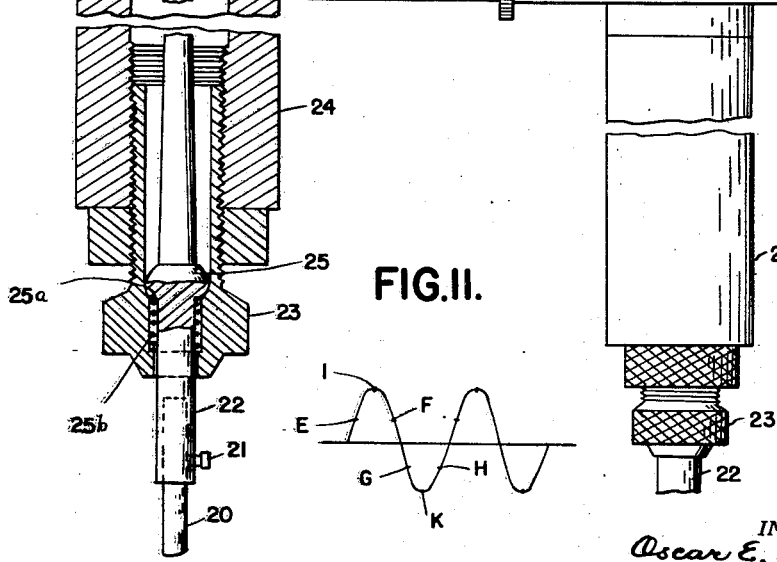
INVENTOR
Oscar E. Rosen
BY Swan, Frye & Hardesty
ATTORNEYS Dec. 12, 1944.　　　　O. E. ROSEN　　　　2,364,873
CONTROL DEVICE FOR DUPLICATING MACHINES
Filed Dec. 14, 1938　　　3 Sheets-Sheet 2
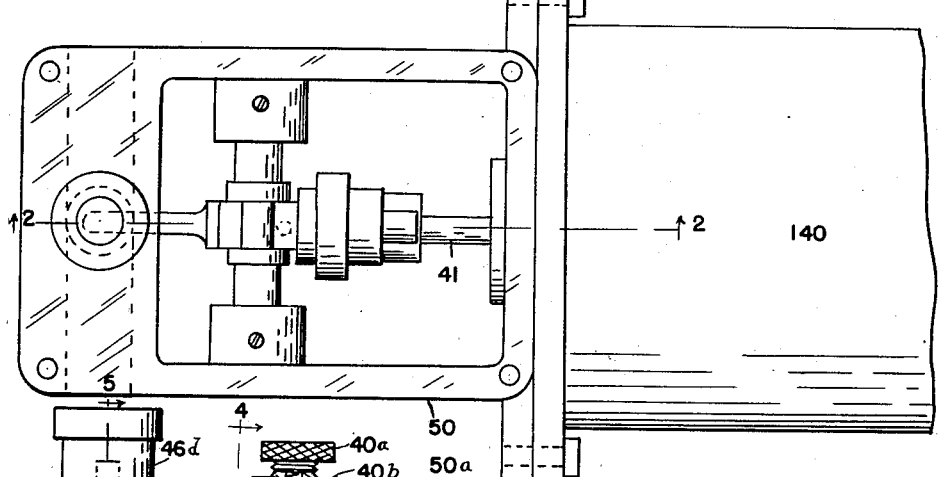
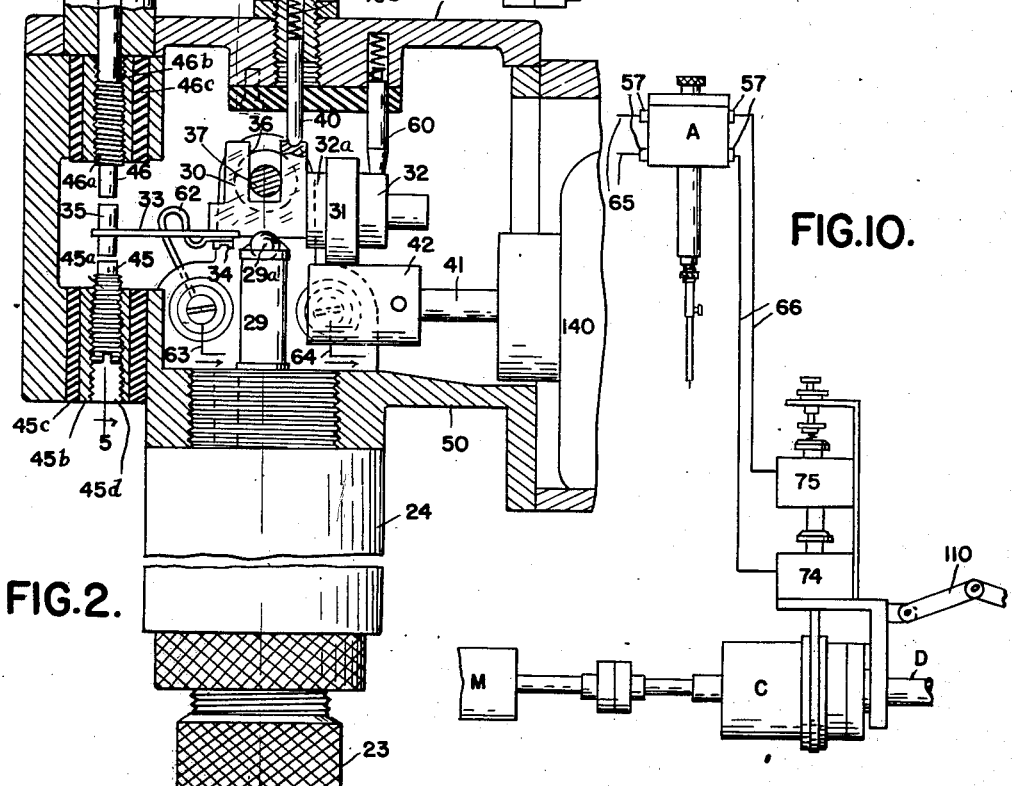
INVENTOR
Oscar E. Rosen
BY
　　ATTORNEYS Dec. 12, 1944.   O. E. ROSEN   2,364,873
CONTROL DEVICE FOR DUPLICATING MACHINES
Filed Dec. 14, 1938   3 Sheets-Sheet 3
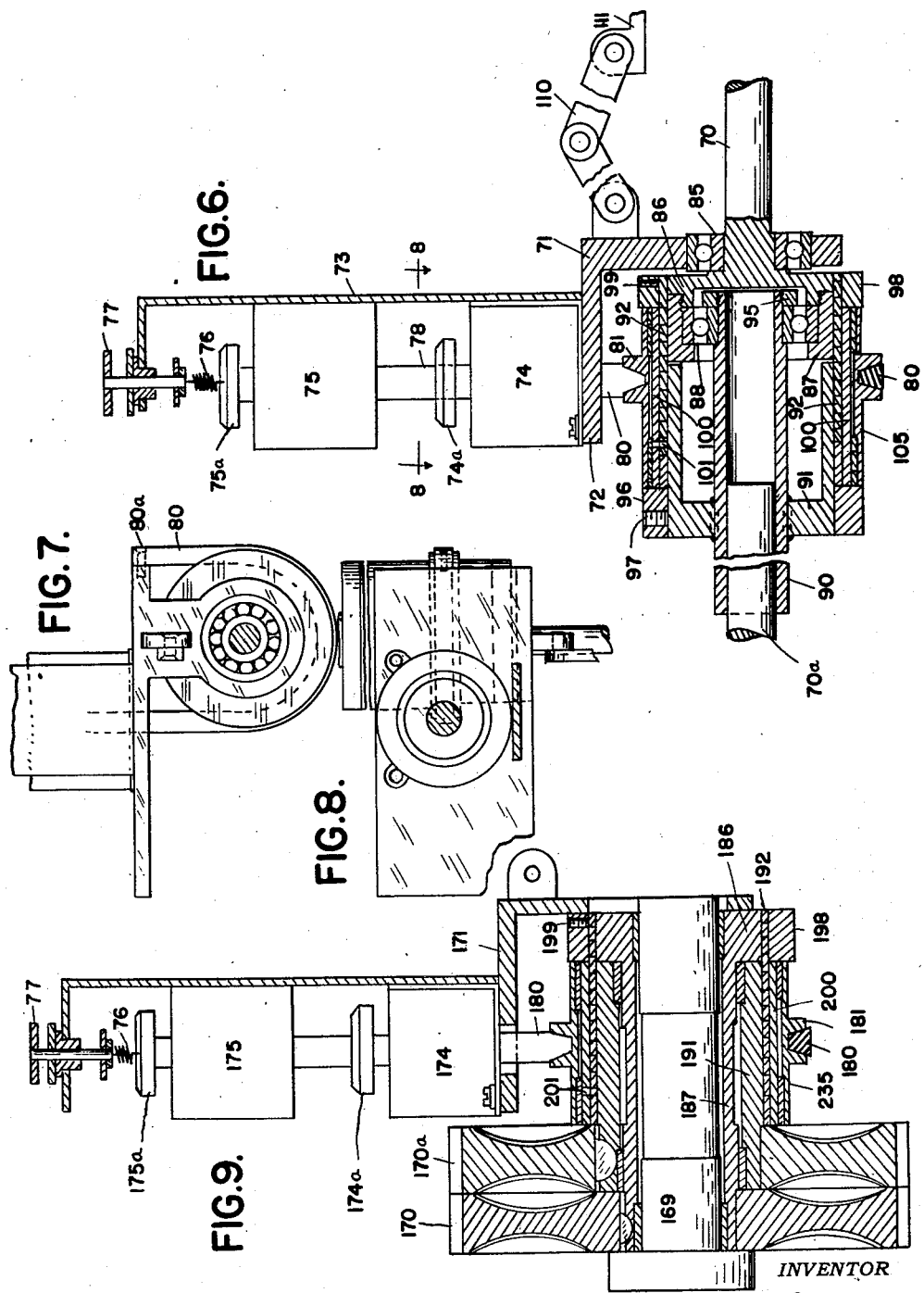

Patented Dec. 12, 1944

2,364,873

UNITED STATES PATENT OFFICE 2,364,873

CONTROL DEVICE FOR DUPLICATING MACHINES

Oscar E. Rosen, Detroit, Mich.

Application December 14, 1938, Serial No. 245,710

5 Claims. (Cl. 90—13.5)

The present invention relates to control devices for duplicating machines of the type wherein a tracer in contact with a pattern is moved thereby and in being so moved causes variations in electric circuits which in turn control the action of the pattern reproducing machine.

As an example of a machine to which the present invention is applicable, reference may be made to my application, Serial No. 138,140, filed April 21, 1937, for "Duplicating machines," (now Letters Patent No. 2,138,208, issued November 29, 1938) showing a milling machine in which the relative movement of the cutter and work toward and from each other is produced by an auxiliary unit which in turn is controlled by a tracer.

The auxiliary unit described in the said application comprises a reversible hydraulic motor coupled to a suitable feed on the milling machine and controlled by a suitable valve to rotate the feed in the desired direction, the valve being controlled by the tracer.

The tracer as described in that application was so constructed as to cause the movement of the valve from a neutral position to either of two positions and thereby to cause operation of the feed at a constant rate in one or the other of the two directions.

It should be understood that the milling machine mentioned is by way of example only as the unit is applicable to any form of cutting machine in which the work and cutter are to be moved relatively to and from each other while the machine itself or some other means causes the progressive relative movement of the work past the cutter.

In my application, Serial No. 179,945, filed December 15, 1937, for "Tracer for duplicating machines" (now Letters Patent No. 2,162,491, issued June 13, 1939) there is disclosed an improvement in tracer controls for such auxiliary units and cutting machines in which, instead of the uniform rate in one direction or the other, the feed rate is controlled in accordance with the angle of the cut, the valve being positioned at an intermediate position to determine the speed of the feed motor, and in addition the tracer is so constructed that an abrupt rise on the pattern causes an additional circuit to be established to stop the progressive relative movement of the cutter and work until the abrupt rise has been surmounted.

While these prior constructions are entirely suitable for most purposes, it has been found that for certain kinds of work they were insufficient. For example, while the control device of the second mentioned application provided for abrupt rises or obstructions on the pattern it did not provide for abrupt descents. Further, with the use of an ordinary electric motor in the tracer, the rate of feed varied slightly at times.

The objects of the present invention, therefore, include a tracer control for duplicationg machines constructed and arranged to produce uniform or uniformly increasing or decreasing rates of feed and thereby produce greater smoothness of operation.

Another object is a tracer control which acts to regulate the feed not only of the cutter relative to the work but also the progressive relative movement of the cutter past the work.

Another object is a tracer control which will regulate the relative progression of the work and cutter in accordance with the angle of the cut.

Other objects will readily occur to those skilled in the art upon reference to the following description and the accompanying drawings in which:

Figure 1 is a side elevation of a tracer involving the present invention.

Figure 2 is a partial vertical section on the line 2—2 of Figure 3.

Figure 3 is a top plan view of the same with the cover plate removed.

Figure 4 is a vertical section on line 4—4 of Figure 2.

Figure 5 is a section on line 5—5 of Figure 2.

Figure 6 is a central longitudinal sectional view of the feed drive shaft control.

Figure 7 is an elevation thereof from the right of Figure 6.

Figure 8 is a sectional view on line 8—8 of Figure 6.

Figure 9 is a view similar to Figure 6 but of a modification.

Figure 10 is a diagrammatic view showing the coaction of the tracer and drive control of Figures 6 to 9, and Figure 11 is a sine curve illustrating the action of the tracer motor.

In the drawings, the tracer point 20 is shown as a detachable member of suitable size and shape secured as by a set screw 21 in the end of a tracer arm 22 mounted for limited universal movement in a threaded sleeve 23 fixed in the end of a tubular housing 24, the arm 22 being preferably provided with an enlargement 25 of spherical contour seated in a corresponding spherical seat in sleeve 23. Further, for a purpose to be described later, the enlargement or ball 25 is cut away underneath to provide a shoulder 25a and the seat counterbored as shown to receive a spring 25b acting between the shoulder 25a and the bottom of the counterbore.

It should be noted that the ball 25 is at such a location on arm 22 that the lever arm above the ball is considerably longer than the arm below the ball, so that the movement of finger 20 will result in a larger movement of the upper end 22a of the arm. At the upper end, the arm 22a is provided with a concave seat 26 in which is located a ball 27 upon which rests the reversely concave end of a short plunger 28, which is mounted in a suitable bearing in the upper end of the tubular housing 24. The tubular housing 24 is secured to the lower side of a main housing 50, in which are located the parts coacting with the tracer arm and plunger 28. The plunger 28 is pointed at its upper end, as at 28a, the point furnishing a pivot for a member 29 located between plunger 28 and a short lever 30, against which it presses through the action of an interposed ball 29a, the bottom face of the lever being provided with a depression in line with its pivot for the reception of the ball 29a.

The lever 30 is a short member extending lengthwise of the housing 50 and carries on one end a roller 31, mounted between two spacers 32 and 32a and has fixed to its other end a spring arm 33, as by screw 34, which in turn carries a double contact 35.

The lever 30, further, is slotted, as at 36, for the reception of a pivot pin 37, the vertical walls of the slot being accurately parallel and bearing on the pin 37; while at that side of the slot toward the motor is formed a seat for the end of a spring plunger 40.

The lever 30, as stated above, is pivoted on a pin 37. This pin is shown as extending at each end into a fibre or other insulating block 37a and may carry spacers 37b in order to accurately position the lever 30. The pin 37 may also be of small diameter and a suitable bushing 37c used thereon in the slot 36.

At one end of the housing 50 is mounted a synchronous motor 140, having its drive shaft 41 extending into the casing in line with the plane of movement of lever 30 and below the roller 31. The shaft 41 has fixed thereto a cam 42 upon which the roller acts, to provide for the rapid oscillation of lever 30. For reasons which will be given later, the cam 42 may be provided with one, two, four or even more lobes so that the number of oscillations will be increased. Operation of the motor will, as indicated, cause oscillation of the lever 30 and thereby the double contact 35.

Contact 35 is located near one end of the housing 50 between two adjustable stationary contacts 45 and 46 carried in respectively the lower and upper walls of the housing 50. These contacts 45 and 46 are carried upon studs 45a and 46a threaded into suitable bushings 45b and 46b fixed in insulating sleeves 45c and 46c in turn fixed in the walls of housing 50.

The stud 45a may be fixed in adjusted position and locked by means of a lock screw 45d while it is preferred to make the stud 46a sufficiently long to extend to the outside of the housing 50 to permit attachment of an insulating knob 46d by means of which it may be adjusted or removed when it is desirable to remove the cover 50a of the housing 50.

Further (see Figure 5), the housing 50 is provided with four horizontally arranged sockets 51, 52, 53 and 54, each of which comprises a conducting bushing 55 extending to the inside of one of the bushings 45b and 46b and serving to fix these in place, each bushing 55 being insulated from the metal of the housing by an insulating sleeve 56 and each bushing 55 being adapted to receive a suitable plug 57 upon the end of a cable or other conductor, as indicated in Figure 10.

As stated above, the housing 50 includes a removable cover 50a. In this cover is mounted the spring pressed plunger 40 which is of non-conducting material and carried in the cover in such manner as to permit a small amount of lateral movement. The plunger, however, is seated in a screw plug 40a so that the tension of the spring 40b, backing the plunger, may be adjusted. The cover 50a also carries a second spring backed plunger 60 which presses upon the spacer 32 on lever 30.

The combined action of plungers 40 and 60 insures the maintenance of contact between roller 31 and cam 42 while the plunger 40 also serves to balance the up thrust of spring 25b in sleeve 23.

As stated above, operation of the motor 140 will produce oscillation of lever 30 and the several parts should be so constructed and adjusted that when the tracer finger 20 is not in contact with anything this oscillation will cause the contact 35 to make substantially continuous contact with the stationary contact 45. When, however, the finger 20 contacts anything, such as a pattern, any resulting movement or displacement of the finger, whether sidewise or directly upward, will cause an upward movement of lever 30 until the contact 35 will touch neither of the stationary contacts 45 and 46. Further displacement, however, will cause the contact 35 to make repeated contacts with stationary contact 46, until with extreme movement upward the contact is substantially continuous.

The tracer, so far described in its mechanical features, is provided with suitable conductors and with provision for a supply of alternating electric current as indicated in Figures 1, 2 and 4.

Suitable plug-in or other connections to a source of current are indicated in Figure 1 at 60 and 61. From one of these, inside the housing 50, a suitable flexible conductor 62 leads to the lever arm 30 and is conveniently connected thereto by the screw 34 which secures the spring arm 33. Also from inlets 60 and 61, suitable connections, indicated at 63 and 64, are led to the motor 140, to provide for operating the latter.

From the plug-in connections 51 and 52, or alternately 53 and 54, suitable leads extend to the two solenoids controlling valve operation in the cutting machine operating unit as mentioned above and as described in co-pending application, Serial No. 138,140. These leads are indicated at 65 in Figure 10 and through these are made and broken the circuits that control the relative movement of the cutter and work toward and from each other.

The relative progressive movement of the cutter past the work, for example the progressive movement of the work table, is controlled by circuits made and broken through the same contacts and through connectors plugged into the connections 53 and 54, or alternately 51 and 52, which lead to the device illustrated in Figures 6 to 9. These leads or connectors are indicated at 66 in Figure 10.

In these figures (referring first to Figures 6 to 8)

there is shown a clutch mechanism that is constructed and arranged to be set into a drive shaft of a cutting machine, for example, a milling machine. The drive shaft, for example, is the one that actuates the feed screw that causes the work table to move past the cutter or the cutter to move past the work as the case may be.

Such a shaft or suitable section thereof is shown at 70 and 70a, the driving means being connected to the part 70, the part 70a being connected to the said feed screw, and the clutch mechanism being interposed therebetween.

This clutch mechanism, as shown, comprises a bracket 71 which includes a platform 72 and an upright portion 73 for the support of two solenoids 74 and 75, one above the other. These solenoids are each provided with an armature, 74a and 75a, and the two armatures fixed together and held in position by a suitable spring 76 adjustably positioned by a thumb screw 77. Further, the two armatures indicated as a whole at 78, are so positioned that energizing either solenoid will cause the two to move downwardly.

To the lower end of the armature couple is fixed one end of a loop 80 of flexible material, shown in the drawing as a piece of V-belt material, the other end of the loop being fixed as at 80a to the bracket 71. This loop 80 passes around the clutch mechanism and coacts, as will be described, with a pulley track 81 thereon.

In the clutch mechanism, the shaft 70, after it passes through the bearing 85 which carries the bracket 71, is enlarged to provide a cup. The cup consists of the flange 86 having a ring 87 threaded thereon, the outer surface of ring 87 forming with the edge of flange 86 a cylindrical surface of considerable area. The cup is formed of the two parts to permit the insertion of the bearing 88.

The shaft 70a is likewise provided with a cup portion by fixing thereto, as by welding, a sleeve 90 and to the sleeve a cup member 91, as by welding, of the same diameter as ring 87. Further, the sleeve is extended beyond the edge of cup member 91 to the inside of the cup 86—87 and be piloted therein in bearing 88. In assembling these parts, the bearing and ring 87 may be placed upon the end of sleeve 90 and fixed in place by a nut 95 and then the ring 87 screwed to flange 86.

The two cup parts upon the shafts when properly assembled present together a smooth cylindrical surface of which one portion is fixed to shaft 70 and the other to shaft 70a.

Around the so formed cylinder is a spiral clutch element 92 which extends to the extreme edge of flange 86 and to near the far edge of cup member 91 where it abuts a ring 96 fixed to the latter, as by a set screw 97. This spiral 92 is fixed to flange 86 by means of an embracing ring 98 through which and into the spiral passes a screw 99.

Overlying the spiral 92 and between rings 96 and 98 is a sleeve 100 and to this the free end of spiral 92 is fixed as by means of a pin 101.

Overlying sleeve 100 and between rings 96 and 98 is a second sleeve 105 upon the outer periphery of which is formed the pulley track 81 and between sleeves 100 and 105 are several bands or rings of preferably brass or bronze which will permit the two sleeves to move relatively but provide a small friction between the two so that, when the sleeve 105 is held against rotation, it will retard the movement of sleeve 100. This in turn will, by retarding the end of spiral 92 being carried around by cup 86—87, cause it to wind tightly against ring 87 and cup 91 so that the two shaft parts 70 and 70a are coupled together.

As indicated above, the sleeve 105 is held or released for rotation by the loop 80 and this actuated by the solenoids 74 and 75.

The bracket 71 is fixed against rotation with the clutch assembly by means of an arm 110 fixed to a suitable stationary element 111.

In Figure 9 is shown a form of the clutch particularly adapted for use with a lathe.

In this form the power is applied by a gear (not shown) to the gear 170. This gear 170 is keyed to a sleeve 187 rotatably carried on a stud 169. This sleeve 187 at the end opposite gear 170 is outwardly flanged as at 186 to correspond to flange 86 in Figure 6.

Rotatably mounted upon sleeve 187 is a second sleeve 191 to which is fixed a gear 170a and this sleeve is of the same diameter as flange 186, forming therewith a two part cylinder as in the previous form. This cylinder is surrounded by the spiral spring 192 fixed at one of its ends to flange 186 as by a screw 199 and ring 198. The other end of spiral 192 is fixed as by pin 201 to an enclosing sleeve 200 which in turn is within a sleeve 235 provided with the track 181 for belt loop 180.

The loop 180 is actuated in the same fashion as already described by solenoids 174 and 175 and, as stated, when the loop is tightened, the drive gear 170 is clutched to the driven gear 170a. The latter through suitable gearing (not shown) of course drives the lathe feed screw.

Figure 10 is a more or less diagrammatic showing of the connection of the tracer and clutch and the use of the tracer in controlling the progressive feed of the cutting machine in accordance with the angle of cut.

In this figure the tracer A will be mounted upon the cutting machine in position to trace the profile of a pattern which is being moved in a path having the same relation to the path of the work as the relation of the position of the tracer to the position of the cutter. Further the clutch C will be placed in a position intermediate the ends of a feed drive shaft D of a machine M.

With solenoid 75 connected to contact 46 and solenoid 74 connected to contact 45 and with the two contacts 45 and 46 also connected to the valve controlling solenoids in the cutting machine control unit of application, Serial No. 138,140, it will be seen that when the contact 35 in the tracer touches either contact 45 or 46 one of the solenoids 74 or 75 will be energized to cause the clutch C to disconnect the parts of the drive shaft D, and the more frequent and longer the contacts, the more continuous will be the declutching action. It should be noted that the spring 76 supporting the armatures 74a and 75a should be of sufficient strength to maintain the armatures "up" under conditions wherein either solenoid is energized only substantially instantaneously. The inertia of the armatures and the connecting rod will of course aid this action.

When, however, the tracer strikes an obstruction, for example a vertical wall, the continued contact of element 35 with the upper contact 46 will cause a continuous energization of one of the solenoids 74 or 75 and release the clutch while the machine operating unit moves the tracer and cutter vertically along the pattern and work.

Likewise, when the tracer drops from an edge the progressive action of work and pattern is halted until the tracer again strikes something.

Further, on quite steep sloping surfaces, the relatively long contacts of element 35 with one or the other of contacts 45 and 46 will produce a slower progressive action due to clutch slippage.

In the above description, mention is made that the motor 140 is a synchronous motor. This is an important development and insures the uniformity of action of the cutting machine control unit.

When an ordinary motor is used there may be no synchronism between the mechanical movement of the lever 30 and cycle of the alternate current passing through contact 35 to the valve actuating solenoids. Because of this fact it may sometimes happen that the current impulse to a solenoid will be at a time when the current alternation is changing direction. This, of course, results in a very small effect on the valve. On the other hand, the impulse might be given when the current is at its maximum and with a corresponding result. With the ordinary motor this difficulty is extremely difficult if not impossible to overcome.

However, the use of a synchronous motor to actuate lever 30 enables one with a very simple adjustment to select the portion of the current cycle which gives the best results.

For example, using a motor running at 1800 R. P. M. a four lobed cam 42 will produce 7200 oscillations of lever 30 per minute. This with 60 cycle A. C. current means that the impulse may be taken at any part of the cycle or at any part of a half cycle.

For example, as indicated on the sine curve of Figure 11, by suitably shifting the cam 42, the impulse may be taken at E or I or at any time during the cycle that is determined to be desirable, and all the impulses will be the same providing there is no movement of tracer arm 22.

Of course, the same or similar results will be had by using a two lobed cam with a motor of twice the speed or other combinations may be used to compensate for current having a different number of cycles per minute.

In using the 7200 oscillation disposition, it is possible to obtain two uniform impulses per cycle, for example, at E and G or at F and H. By using a two lobed cam 42, one impulse per cycle will be obtained, and this may be at any of the points E to K or at any other point desired. This selection is easily accomplished by making a slight adjustment of the radial position of the claim 42 upon the shaft 41.

Now having described the invention, it is to be understood that it is not to be limited to the specific disclosure herein but only by the scope of the claims which follow.

What I claim is:

1. In a tracer assembly for electrically controlled duplicator machines, a synchronous motor, a contact carrying element oscillatable by said motor, a pair of other contacts, means for supplying alternating electric current to said motor and to the contact upon said oscillatable element, a tracer finger and means actuated by said finger for causing said oscillatable contact to coact with one or the other of said pair of contacts.

2. In a tracer for electrically controlled duplicating machines, a tracer finger, a pair of electric contacts, a contact carrying arm arranged to complete a circuit through either of said pair and located between them, synchronous motor means for oscillating said arm in a path shorter than the distance between said pair, means actuated by said finger for moving said oscillating arm bodily toward one or the other member of said pair whereby repeated contact is made between said arm and said member, and means for supplying alternating electric current to said arm and to said motor.

3. In electrically controlled duplicating cutting machines, a tracer unit including a tracer finger for following the profile of a suitable pattern, electrically operated means for controlling the feed of said machines, said means being controlled by the movement of said tracer finger by said pattern, said tracer unit including means for rapidly and repeatedly making and breaking circuits to said feed controlling means, means for supplying alternating electric current to said circuits and to said circuit making and breaking means, and means for modifying the relative length of the circuit making and breaking periods, said circuit making and breaking means including a synchronous motor.

4. A tracer assembly for electrically controlled duplicating machines, said assembly including a tracer finger displaceable with relation to said assembly and adapted to follow the profile of a pattern, means for establishing an alternating electric circuit through said assembly to said controlled machine, means in said assembly for repeatedly making and breaking said circuit, said making and breaking means including a synchronous motor operable from said alternating electric circuit, and means actuated by said finger for varying the relative duration of the make and break period of the thus produced intermittent circuit in proportion to the displacement of said finger, said synchronous motor insuring the production of said make periods at the desired portion of the current cycle.

5. In combination with a cutting machine including tracer controlled means for feeding the cutter and work relatively to and from each other, means for feeding the work and cutter relatively past each other, a clutch for the latter feeding means, and electric control means for said clutch, a tracer unit including means for making and breaking circuits to the first-mentioned feeding means and simultaneously to said clutch control means, said make and break means comprising an oscillatable element in said tracer and carrying a pair of contacts and motor means for oscillating said element.

OSCAR E. ROSEN.